Jan. 1, 1957
W. MESSINGER
2,775,931
PRESS
Filed March 11, 1953
2 Sheets-Sheet 2
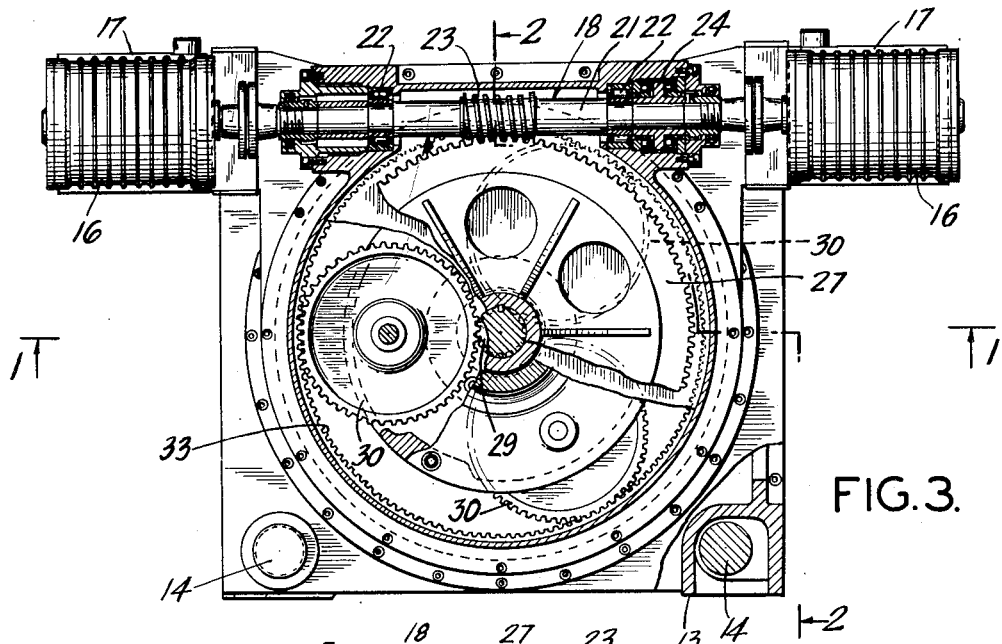
FIG. 3.
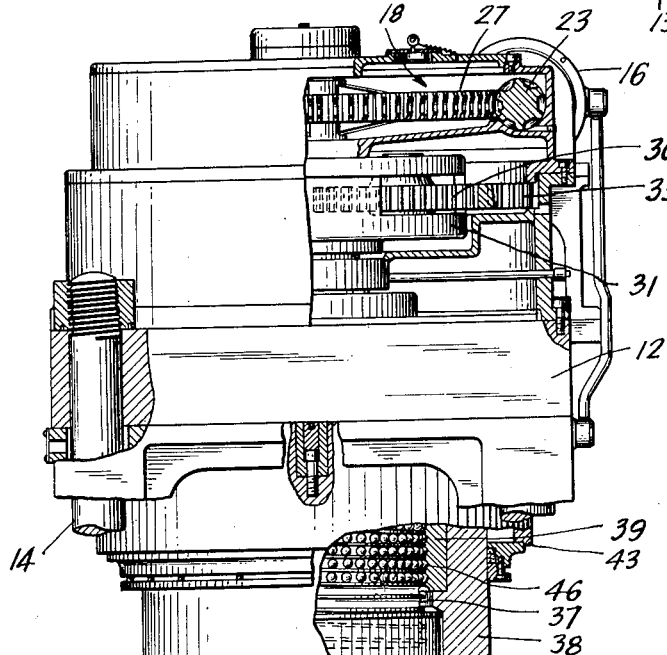
FIG. 2.
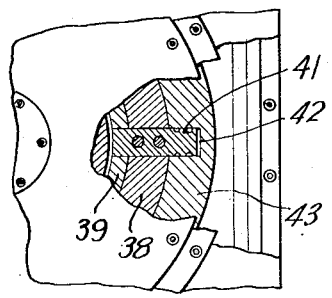
FIG. 4.
INVENTOR.
WILLIAM MESSINGER
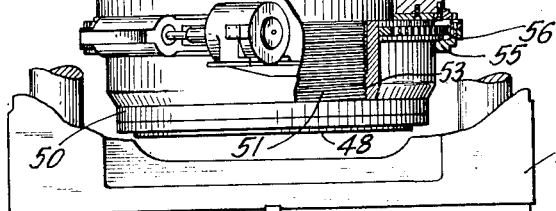
his ATTORNEYS.

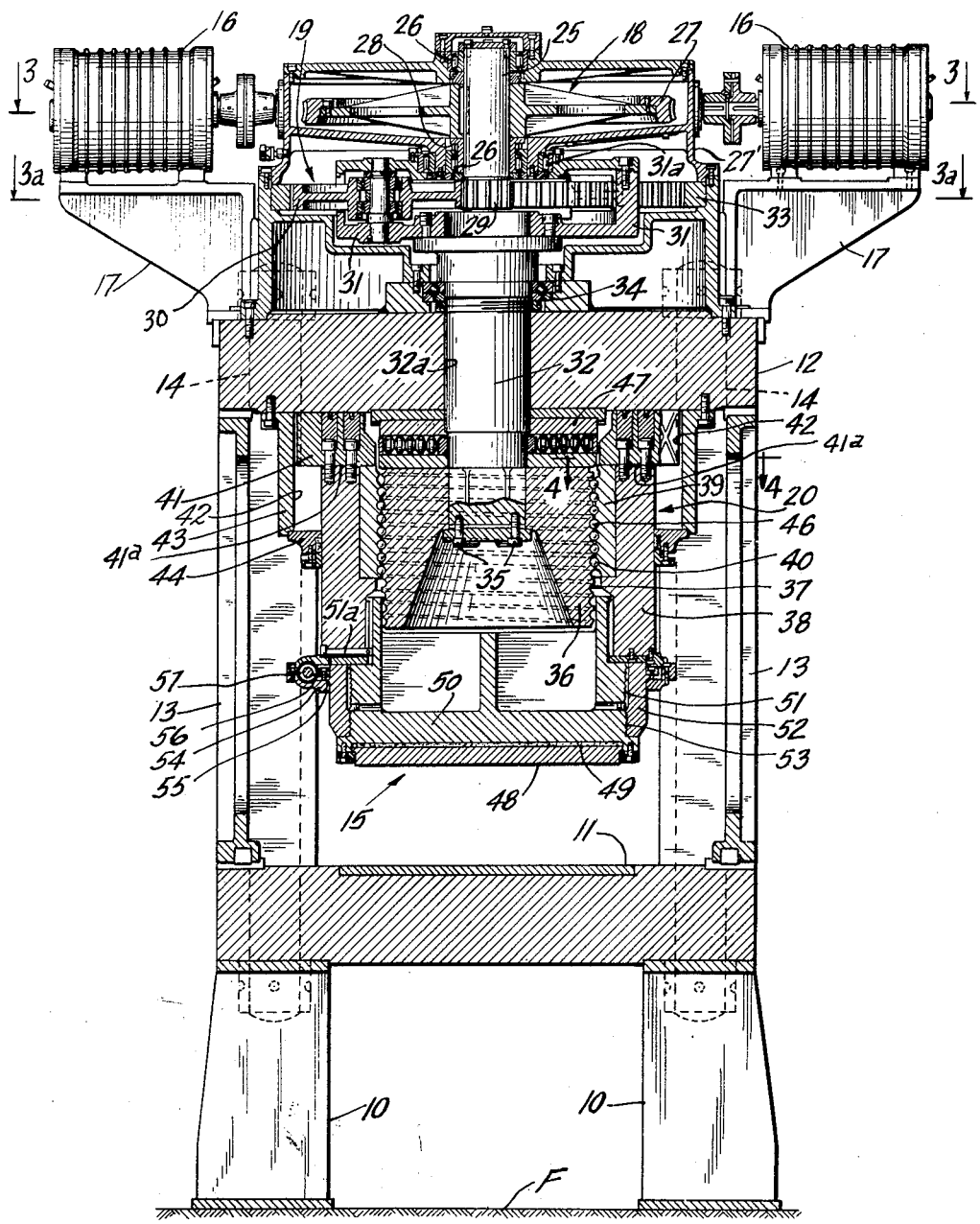
FIG. I.

United States Patent Office 2,775,931
Patented Jan. 1, 1957

2,775,931
PRESS

William Messinger, Philadelphia, Pa.; The First National Bank of Philadelphia, administrator of said William Messinger, deceased, assignor to Messinger Bearings, Inc., Philadelphia, Pa., a corporation of Pennsylvania Application March 11, 1953, Serial No. 341,805

8 Claims. (Cl. 100—289)

This invention relates to presses and more particularly to new and improved presses adapted to utilize screw drives of the rolling ball type.

Simple screw presses are little used because their mechanical efficiency is extremely low and their traverse slow. Hydraulic presses have wider use, but their efficiency is also low and they are only a little faster than screw presses. Fly-presses combine kinetic energy devices, such as fly wheels, with steeply pitched, hence, efficient screw threads, and are used mostly where an impact blow is required. The present invention is concerned with press designs which may use less steeply pitched screws but which, nevertheless, achieve high efficiency in the screw drive as well as high ram pressures in in the absence of kinetic energy devices.

It is, therefore, one object of this invention to provide a new and improved press utilizing a screw drive.

Another object of the invention is to provide a press which utilizes a rolling ball screw drive to achieve high ram or platen pressures without attendant losses due to inefficiency in the drive.

Yet another object of the invention is to provide a new and improved press which is susceptible of fine control to facilitate its operation as one of a battery of similar presses, thus to control the action of a subdivided or multiple section platen.

These and other objects and features of the invention may be attained by providing a press having a ram which is driven by a train of torque amplifiers which may include, for example, a worm gear drive at the high speed input end, an intermediate planetary gear system driven by the worm gear, and a screw transmission preferably of the rolling ball type, connected to the output side of the planetary gear system. This series of reduction drives may be integrated in a single press unit in accordance with the invention in a novel manner which will be apparent from the following description of a press taken in conjunction with the accompanying drawings wherein:

Figure 1 is a front view of a press constructed in accordance with the present invention and shown partly in vertical section, taken along the line 1—1 of Figure 3, looking in the direction of the arrows;

Figure 2 is a side view of the upper portion of the press illustrated in Figure 1, and shown partly in vertical section along the line 2—2 of Figure 3, looking in the direction of the arrows;

Figure 3 is a top view of the press shown partly in transverse section, taken along the line 3—3 of Figure 1, and partly broken away to show the mechanism in transverse section along the line 3a—3a also of Figure 1, looking the direction of the arrows in both cases; and Figure 4 is a partial view in partial section, taken on line 4—4 of Figure 1, and looking in the direction of the arrows.

Referring to the drawings, the invention is illustrated as embodied in a press having a frame including legs 10 supported on a foundation F, a bed 11 and a cross head 12, the latter being supported by standards 13 and through-bolts 14. Above the bed 11 and beneath the cross head 12 is an axially movable ram assembly 15 which may be actuated by a pair of electric motors 16 mounted on brackets 17 at the upper end of the frame.

Between the motors and the ram 15 is a reduction drive mechanism for converting the high speed input power of the motors 16 to rectilinear motion of the ram assembly 15, the reduction drive including a worm and gear system 18, a planetary gear system 19 and a rolling ball screw system 20, all connected in series and all of which are described in detail below.

As best seen in Figure 3, the worm gear system 18 includes a drive shaft 21 journaled in a pair of roller bearings 22, the ends being driven by the motors 16. The shaft 21 is provided with a worm 23 and a thrust bearing 24 to resist axial thrusts of the worm 23. A vertical shaft 25, journaled in the frame of the machine by roller bearings 26 carries a large worm gear 27 which engages the worm 23. The lower end of shaft 25 carries the sun gear 29 of the planetary gear system 19. A small axial thrust bearing 28 supports the worm gear 27 and input shaft 25 upon the housing 27' for the worm gear. A plurality of planet gears 30 are journaled on a spider 31 that is secured to the upper end of a vertical main arbor 32, a bearing 31a supporting the spider 31 upon the housing 27'. The several planet gears 30 engage a fixed internal ring gear 33 and, in accordance with well known principles, rotation of the sun gear 29 will result in a relatively slower and more powerful rotation of the spider 31 and hence of the main arbor 32.

Referring to Figure 1, the main arbor 32 is journaled in an X-type bearing assembly 34, the details of which are explained in my United States Letters Patent No. 2,430,359, dated November 4, 1947, the bearing 31a also serving as a means for positioning the upper end of the main arbor.

Attached to the depending end of the main arbor 32 by bolts 35 is a driving head 36 having threads 37 in the form of one or more sets of spiral grooves in its outer cylindrical surface. The driving head 36 is received within a nut holder 38 in which is secured a nut 39 that is in the form of a sleeve having one or more sets of spiral grooves or threads 40 in its internal surface. The nut 39 is secured in the nut holder 38 by means of a plurality of radially extending keys 41 that are received within slots 41a formed in the nut holder 38 and within corresponding slots formed within the nut 39. The keys 41 are bolted in place, as illustrated in Figure 1, and the outer ends thereof are received within keyways 42 formed in a cylindrical casing 43 that is carried by the cross head 12. At the lower extremity of the cylindrical casing 43 a ring 44 is mounted, this ring being provided with suitable packing to engage the outer surface of the nut holder 38.

A multiplicity of balls 46 is provided in the spiral grooves formed in the driving head 36 and nut 39 in order that the rotary motion of the driving head 36 may be translated into rectilinear movement of the nut 39 and its associated elements. Between the driving head 36 and the cross head 12 there is provided a heavy duty thrust bearing 47 in order that the forces resulting from the downward movement of the nut 39 may be imparted satisfactorily to the cross head.

The working face of the ram 15 preferably comprises a hardened tool steel platen 48 seated against a pad 49 of suitable material described in my Patent No. 2,064,352 entitled "Self-Aligning Mounting for Bearings," this pad being carried by a head 50 that is mounted upon the nut holder 38 by means of a ring 52. Interengaging threads 51 and 53 on the head 50 and ring 52 permit the position of the head 50 to be adjusted with respect to the ring 52. One or more keys 51a prevent rotational movement between the head 50 and nut holder 38. Rectilinear movement of the head 50, is however, permitted by the keys 51a in order to accomplish the adjustment of the daylight opening of the press. Such adjustment is effected by the mounting of the ring 52 upon the nut holder 38 with provision for rotation only, by means of a circumferential retaining flange 54. Rotary movement of the ring 52 with respect to the nut holder 38 is accomplished by means of a worm and worm wheel connection 57, thus permitting the ring 52 to be rotated manually to cause the head 50 to be adjusted vertically.

In operation, the worm shaft will be rotated at a relatively high speed. Because the power supplied by the worm drive is transmitted to the platen 48 successively by the step-down planetary gear system and low friction rolling ball screw drive mechanism, the working pressures on the worm drive will be relatively low. As a result, the efficiency of the worm drive mechanism will be relatively high. The planetary gear system, as an intermediate drive transmitting mechanism, is well suited to efficient operation at relatively lower speeds and higher loads while the screw drive, because of its dispersal of the load over a large bearing area is well suited to the efficient transmission of forces in the final stage to the press platen where the loads are at a maximum, and the speeds are at a minimum. This mechanism thus provides a highly efficient multiple reduction drive, the aforesaid elements coacting in a complementary fashion to provide an efficient machine.

Suitable stagings and control panels may be mounted upon or adjacent the structure above described in order to control the operation of the machine. A typical press may be made in accordance with this invention to accommodate, for example, a 31-inch platen and to introduce compression forces in the vicinity of one thousand to two thousand tons. Because of the fine degree of control obtainable with the press, a battery of press units may be employed to operate in a desired fashion upon subportions of an entire multiple section platen and various combinations of units, and modified versions of each unit may be utilized in accordance with this invention.

While the invention has been described with specific reference to the accompanying drawings, it is not to be limited save as defined in the accompanying claims.

I claim:

1. In press, having a frame and a platen movably mounted in the frame and a drive shaft, journalled in the frame, the invention comprising a reduction drive means between the drive shaft and the platen including, in series, a worm and worm gear driven by the drive shaft, a step-down planetary gear system driven by the worm gear, and a screw connection between the planetary gear system and the platen.

2. A press, according to claim 1, wherein the screw connection comprises a central driving element driven by the planetary system and formed with a spiral groove, an outer driven member formed with an internal spiral groove and a plurality of balls each seated in the respective grooves of the inner and outer member.

3. A press, according to claim 1, wherein a main arbor is driven by the planetary system, a driving head on the main arbor, a hollow cylindrical nut surrounding the driving head, cooperating spiral grooves on the head and nut, and a plurality of balls in the grooves.

4. A press, according to claim 3 including a platen on the nut and means is provided to adjust the position of the platen with respect to the nut.

5. A press, according to claim 1, wherein electric motors are provided on the frame and connected to drive opposite ends of the drive shaft.

6. A press, according to claim 1, wherein the frame is provided with a cross head upon one side of which the drive shaft, worm and worm gear and planetary system are mounted and upon the other side of which the screw connection and platen are mounted.

7. A press, according to claim 6, wherein the screw connection includes a driving head driven by the planetary gear system, a hollow cylindrical nut surrounding the driving head, cooperating spiral grooves on the head and nut, a plurality of balls in the nut, and a thrust bearing is mounted between the cross head and a driving head of the screw connection.

8. A press, according to claim 1, wherein the frame comprises vertically extending members carrying a bed and cross head, a main arbor journaled in the cross head, a housing on the cross head in which the drive shaft is journaled and in which the worm planetary gear systems are received, means to drive the main arbor by the planetary gear system, a driving head on the end of the main arbor remote from the planetary system, a thrust bearing between the driving head and the cross head, and a rolling ball screw connection between the driving head and the platen.

References Cited in the file of this patent

UNITED STATES PATENTS

| 37,475 | Kuebler | Jan. 20, 1863 |
| 150,313 | Findlay et al. | Apr. 28, 1874 |
| 1,347,785 | Libby | July 27, 1920 |
| 1,350,822 | McNitt | Aug. 24, 1920 |
| 1,825,686 | Walker | Oct. 6, 1931 |
| 2,172,126 | Lansing | Sept. 5, 1939 |
| 2,227,111 | Sturm | Dec. 31, 1940 |
| 2,443,781 | Zacher | June 22, 1948 |
| 2,480,212 | Baines | Aug. 30, 1949 |
| 2,486,242 | Ashton | Oct. 25, 1949 |

FOREIGN PATENTS

| 854,749 | Germany | Nov. 6, 1952 |